United States Patent [19]

Schneider et al.

[11] Patent Number: 4,579,302
[45] Date of Patent: Apr. 1, 1986

[54] SHUTTLE-LAUNCH TRIANGULAR SPACE STATION

[75] Inventors: William C. Schneider, Houston; Reginald B. Berka, Webster; Herbert C. Kavanaugh, Dickinson; Kornel Nagy, Houston; Richard C. Parish, League City; John A. Schliesing; Paul D. Smith, both of Houston; Frederick J. Stebbins, Dickinson; Clarence J. Wesselski, Alvin, all of Tex.

[73] Assignee: The United States of America as represented by the Administrator of the National Aeronautics and Space Administration, Washington, D.C.

[21] Appl. No.: 587,764

[22] Filed: Mar. 9, 1984

[51] Int. Cl.$^4$ .............................................. B64G 1/10
[52] U.S. Cl. .................................................. 244/159
[58] Field of Search .................... 244/158 R, 159, 173; 52/81, 648, 646, DIG. 10, 143

[56] References Cited

U.S. PATENT DOCUMENTS

| | | | |
|---|---|---|---|
| 3,169,725 | 2/1965 | Berglund | 244/159 |
| 3,332,640 | 7/1967 | Nesheim | 244/159 |
| 3,953,948 | 5/1976 | Hogan | 52/81 |
| 4,057,027 | 11/1977 | Hogan | 244/159 |
| 4,259,821 | 4/1981 | Bush | 52/309.1 |
| 4,334,816 | 6/1982 | Slysh | 414/10 |

OTHER PUBLICATIONS

Garibotti et al., "On Orbit Fabrication and Assembly of Large Space Structural Subsystems", pp. 847-865, Acta Astronautic, vol. 7, 1980.

Zylius et al., "Assembly in Space of Large Communications Structure", pp. 501-518, *The Industrialization of Space*, vol. 36, Part 1, 1977.

Nathan, "A Near Term Space Demonstration Program for Large Structures", pp. 57-77, The Industrialization of Space, vol. 36, Part 1, 1977.

Primary Examiner—Galen L. Barefoot
Attorney, Agent, or Firm—Russell F. Schlorff; John R. Manning; Marvin F. Matthews

[57] ABSTRACT

A triangular space station deployable in orbit. The framework is comprised of three trusses, formed of a pair of generally planar faces comprised of foldable struts which expand and lock into rigid structural engagement forming a repetition of equilateral triangles and non-folding diagonal struts interconnecting the two faces. The struts are joined together by node fittings. The framework can be packaged into a size and configuration which can be transported by a space shuttle orbiter in a single orbital flight and when deployed, provides large work/construction area and ample planar surface area for solar panels and thermal radiators. A plurality of modules are secured to the framework and then joined by tunnels to comprise an interconnected modular array disposed along the free edges of the framework. Thruster units for space station orientation and altitude maintenance are provided. The triangular space station provides a structurally stable unit having sufficiently high structural integrity and natural frequency for facilitating docking, satellite servicing and launch operations.

20 Claims, 13 Drawing Figures

SHUTTLE-LAUNCH TRIANGULAR SPACE STATION

The invention described herein was made by employees of the United States Government and may be manufactured and used by or for the Government of the United States of America for governmental purposes without the payment of any royalties thereon or therefor.

FIELD OF THE INVENTION

The present invention pertains to a space station adapted for deployment and assembly in earth orbit. More specifically, the invention provides a triangular shaped space station which is structurally rigid, light in weight, and preferably automatically deployable in earth orbit from a compactly packaged configuration.

BACKGROUND OF THE INVENTION

The space Shuttle Transportation System provides man new opportunities for exploitation of space. The capability to economically place large payloads in orbit offers the chance to perform space missions that previously were impractical. Projects presently under consideration include the construction of a space station to provide permanent manned presence in space. The prospect of such a structure provides unparalleled challenges for developing extremely efficient structural concepts and new and unique ways to fabricate and assemble such a structure.

Realistically, any mission involving constructing large structures in space in the near future must be accomplished via the space shuttle. It is therefore advantageous to develop efficient structural concepts for maximum utilization of the shuttle payload bay and minimize the total number of flights required. Although the space shuttle represents an improvement in orbital payload capability, it is limited to a payload of approximately sixty-five thousand pounds in weight with a diameter of fifteen feet and a length of sixty feet. Such limitations must be taken into consideration.

Space station studies conducted by the aerospace community often depict space station concepts comprising several habitable pod clusters attached to long boom structures supporting solar panel wing-like appendages. A disadvantage of such concepts is the inherent low frequency of their structural arrangement. Small perturbations occurring from docking or maneuvering forces will cause the low frequencies of the booms and wing-like appendages to be dynamically excited requiring control systems to stabilize the structure. While such concepts provide an observation post for observing the earth or deep space and laboratories to perform zero-G experiments, they are not efficient as work platforms that can be used to construct and service large space vehicles for voyages to higher orbits and for interplanetary missions. Those space station configurations that do contain areas for payload storage of fabrication often place such areas in locations that are remote from the center of mass of the space station; therefore, if a payload is mounted on the structure, the mass and center of gravity of the space station will change and additional reaction control must be utilized to stabilize the station in its intended orbital attitude. To minimize the changes in gravity gradient torques and the overall dynamic characteristics that can occur when large masses, such as orbital transfer vehicles or satellites, are attached, removed or moved about, the large transient masses should be placed as near the center of mass as possible. Moreover, the demands of antennas and solar cells for accurate positioning and the requirements of adequate stiffness to avoid undesirable structural distortions require consideration.

SUMMARY OF THE INVENTION

The present invention is a triangular shaped space station having a structural framework formed of three tetrahedral, planar trusses. A series of universal modules to accommodate manned and unmanned activities are secured to the triangular framework without destroying its structural integrity.

Such a structure is kinematically stable and has an inherently stiff structural arrangement with a high natural frequency minimizing orbital control, maintenance and stability problems.

The planar trusses enable attachment of solar panels and thermal radiators across large, stiff, redundant structural areas without significantly lowering system frequencies and eliminate the problems associated with flexible solar panels and radiators. Having the center of mass of the space station located internal to the structure allows for ease of control and center of gravity management during orbital transfer vehicle and satellite servicing. The open construction of the trusses offer excellent work areas for the servicing of orbital transfer vehicles and satellites and the construction of large antennas.

The stiff primary structures simplify the complexity of the attitude control system by minimizing the number of system modes to be controlled. The station is thus very maneuverable which lends itself to the altitude and attitude management necessary for orbital longevity. It is also possible to expand the station to a much larger complex by incorporating additional triangular structural frameworks.

The invention includes an improved method of deploying a space station in earth orbit. The framework may be fabricated on the ground. The truss panels may be collapsed for insertion into the payload bay of the space shuttle orbiter and launch into orbit. On orbit, the bundles are removed from the shuttle, oriented into a co-planar configuration, and are then simultaneously expanded in three-dimensional, translation into the structural framework. Accordingly, much of the initial fabrication can be accomplished on earth and extra vehicular activity by astronauts is minimized.

DETAILED DESCRIPTION

Figure 1:
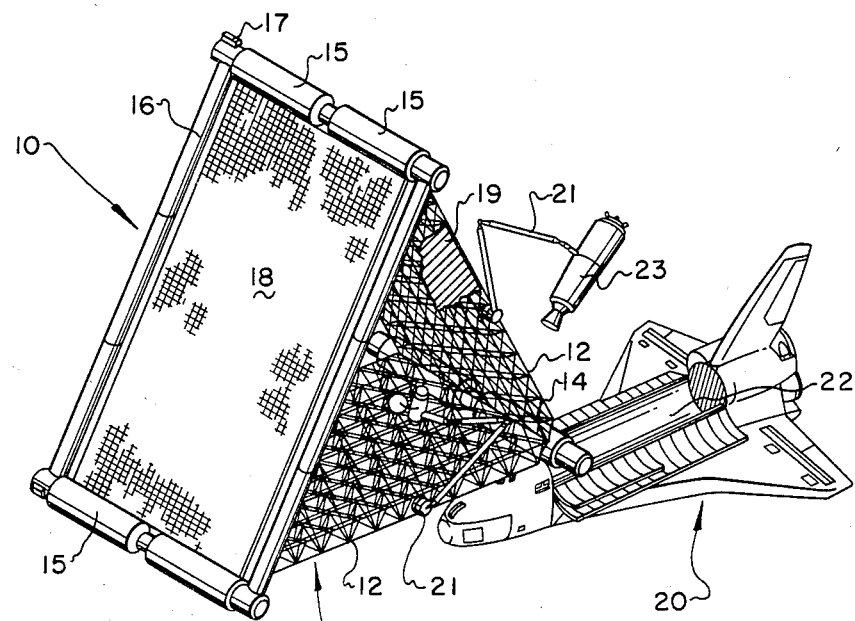
FIG. 1 is a view of an operational triangular space station, being visited by a space shuttle orbiter.

Referring to FIG. 1, the shuttle launched space station 10 of the present invention has a triangular shaped structural framework 11 which is formed by three rectangular shaped truss panels 12 joined together at their ends. The framework 11 being triangular has an open area 13 which may be utilized as a servicing and storage area for orbital transfer vehicles, satellites and other payloads. Secured to the three apexes 14 of framework 11 are universal modules 15 which may be used for habitat, logistics, service, and laboratory. Connecting pressurized tunnels 16 extend along the peripheral edge of panels 12 so that modules 15 are accessible to one another. Thruster units 17 for station orientation are located at the very stiff and strong apexes 14 eliminating the need for additional weight required by thrust loads and provides maximum control authority. A solar panel 18, sized to supply the required electrical power, is attached to the outer face of one of the panels 12. To radiate excess heat to space, thermal radiators 19 may be attached to the outer face of the other two panels.

Still referring to FIG. 1, a space shuttle orbiter 20 is positioned relative to space station 10. A remote manipulator system 21 attached to framework 11 is shown removing an orbital transfer vehicle 22 from the payload pay 23. The manipulator systems are capable of handling and maneuvering payloads delivered by space vehicles as well as performing maintenance operations upon the station itself.

Figure 2:
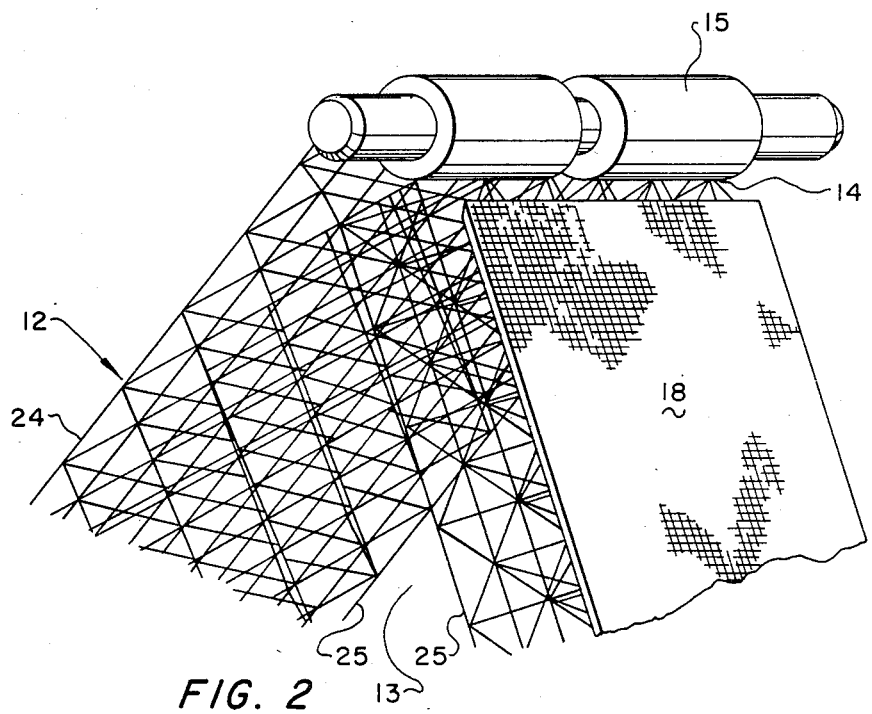
FIG. 2 is a view of an apex of the station illustrating the configuration of the tetrahedral trusses forming the framework.
Figure 3A:
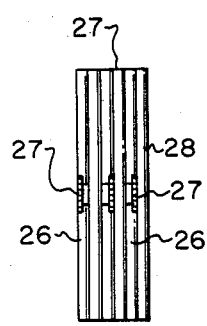
FIGS. 3a, 3b, and 3c are diagrammatic illustrations of one tetrahedral cell showing its collapsed configuration, its expansion, and its final rigid configuration.
Figure 3B:
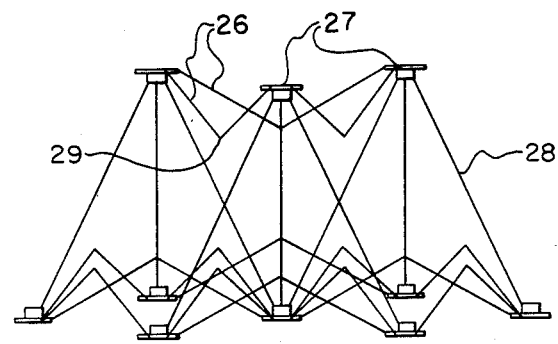
Figure 3C:
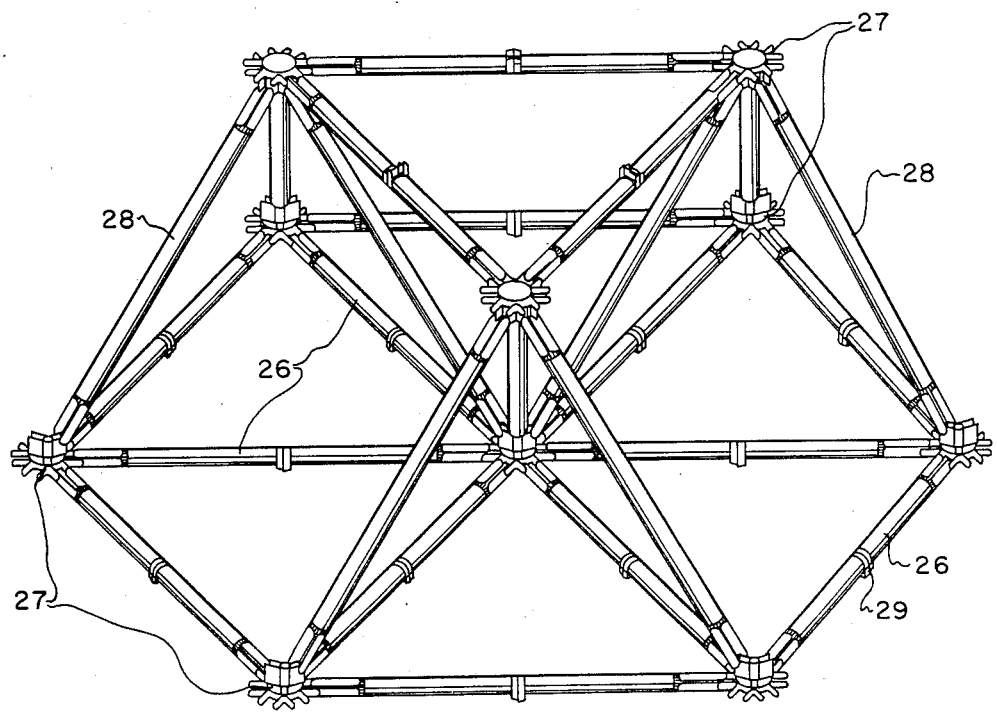

Referring now to FIGS. 2 and 3c each panel 12 is a tetrahedral truss having the configuration disclosed in U.S. Pat. No. 4,259,821, which is incorporated herein by reference. Panel 12 is comprised of a pair of parallel, planar faces 24 and 25 formed of a repetition of equilateral triangles generated by a plurality of foldable face struts 26 which are interconnected by spider like node fittings 27. The two faces 24 and 25 are joined together by non-folding diagonal struts 28 which are also connected to the node fittings 27.

The tetrahedral design is a redundant structure providing alternate load paths throughout the structure in case a single strut is damaged. The struts of the truss may be fabricated from graphite/epoxy composites, graphite/aluminum tubing or the like. These materials are both light in weight and structurally capable of meeting the loading requirements of such configurations. Graphite/epoxy is, in fact, conventionally used for the payload bay doors of the orbitor 20. Since each strut of a tetrahedral truss is the same length, there is a distinct advantage in cost and assembly.

Referring now to FIGS. 3a, 3b, and 3c, there is shown a basic single tetrahedral cell in packaged, expanding and expanded configurations. The foldable struts 26 form, when expanded, an array of equilateral triangles, see FIGS. 2 and 3c. Spider-like node point fittings 27 interconnect the triangles, see FIG. 3c. Also attached to node point fittings 27 are diagonal struts 28 which extend from outer face 24 to the inner face 25. Except for those fittings along the perimeter, six face struts 26 and three diagonal struts 28 are pivotally attached to each fitting 27. The fittings 27 may also be utilized to secure payloads and equipment. The center of fitting 27 provides an unobstructed and adequate area for the addition of male and female attachment hardware.

FIG. 3a shows a single tetrahedral cell in a collapsed configuration. The total length of such a configuration is the length of a single diagonal strut 28 plus the requirements for the node point fittings 27. The dimensions for an entire truss may be calculated by taking into consideration the diameter and length of each strut, the number and spacing of the node point fittings, and the total number of struts. Since the struts 26 fold in half at hinge 29, one-half of the strut lengths from both outer and inner faces 24 and 25 will fold against an adjacent full length diagonal strut 28. The diagonal struts 28 do not fold and, therefore, there is no interference between the folded struts 26.

FIG. 3b illustrates the expansion of the tetrahedral cell in the intermediate stage of deployment. It can be seen from FIG. 3b that struts from the outer face 24 fold downwardly and the struts from inner face 25 fold upwardly with the non-folding diagonal struts 28 pivoting into position. FIG. 3c illustrates a tetrahedral cell after full deployment.

Figure 4:
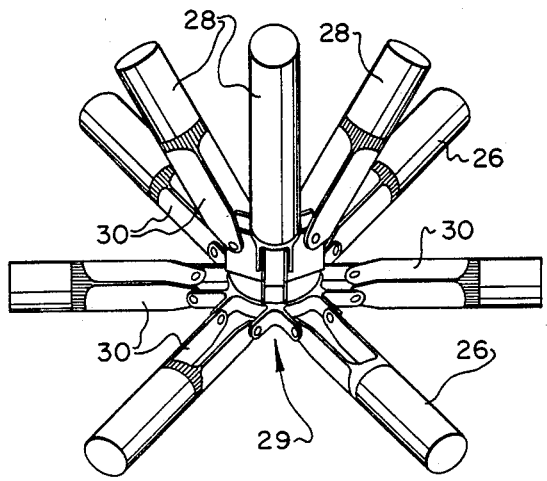
FIG. 4 is a view of a node point fitting and the struts extending therefrom.
Figure 6A:
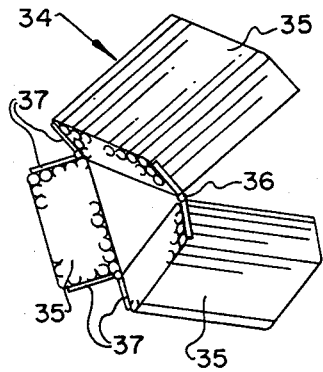
FIGS. 6a, 6b, 6c, and 6d are diagrammatic illustrations of the deployment of the structural framework.

Referring now to FIG. 4, there is shown one embodiment of a node point fitting 27 for pivotal connecting the struts. The node fitting 27 integrally connects the folding face struts 26 and non-folding diagonal struts 28. So that the truss can be collapsed into a compact unit such as shown in FIGS. 3a and 6a, fittings 27 have pivotal strut receiving means 30. Once the panels are deployed the pivotal connections may be locked to provide rigidity.

Figure 5:
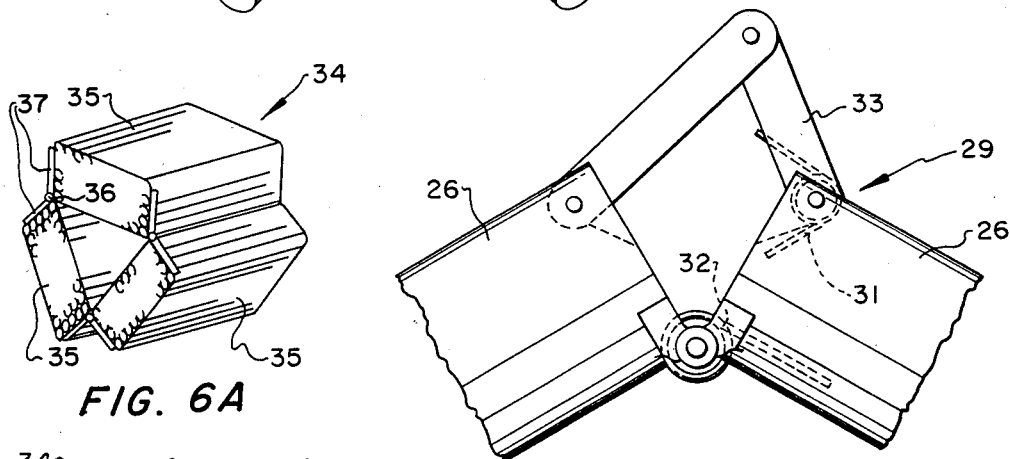
FIG. 5 is a view of a hinge for folding and spring biasing a strut.

FIG. 5 discloses the hinge in co-pending application Ser. No. 659,474 filed Oct. 10, 1984 entitled "Foldable Self Erecting Joint", which is incorporated herein by reference. Hinge 29 is provided with torsional springs 31 and 32 to provide energy to effect expansion of foldable struts 26. A latching member 33 secures the expanded configuration of foldable strut 26. The hinge 29 provides deployment energy and self-locking engagement when truss panel 12 is deployed. Once deployed in orbit, the truss forms the structural nucleus of a geometrically symmetrical structure capable of supporting a plurality of various members and performing a myriad of functions.

Figure 6B:
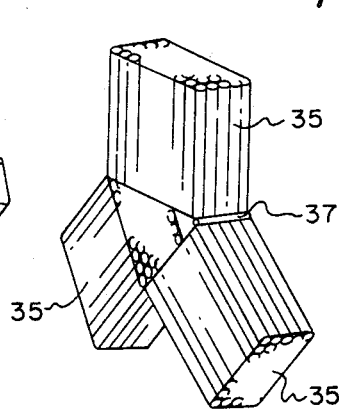
Figure 6C:
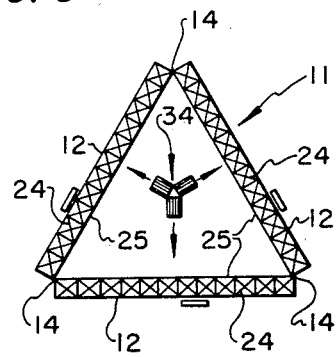

Referring now to FIGS. 6a, 6b, 6c, and 6d, there is shown a method of deployment of a package 34 comprised of three bundles 35, each of which contains the elements for one truss panel. The bundles may initially be hinged at juxtaposed corners 36 preferably by a ball and socket joint 36 facilitating positioning of bundles 35 for placement in payload bay 23, see FIG. 6a. When in orbit, package 34 is removed from the payload bay, and the three bundles 35 are rotated forward toward 90° as shown in FIG. 6b. Latching mechanism 37 which extends along edges of bundle 35 lock the mating edges of bundles 35 together, see FIG. 6c. The latching mechaniam may be similar to that used for an automobile hood, the latching mechanism of one bundle containing pins and the latching mechanism of the other bundle containing latching hooks. The latching may require some astronaut assistance. Also, the individual bundles 35 may be stored separately in the payload bay and then assembled into the configuration shown in FIG. 6c for final deployment.

Figure 6D:
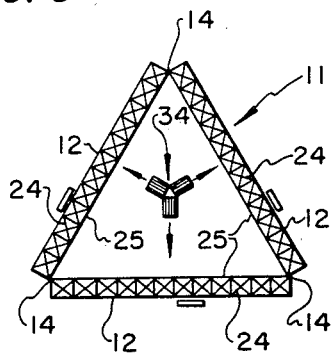

The truss is then expanded with the connected edges securing each panel 12 to the other, see FIG. 6d. Various deployment mechanisms may be used for spring-biasing face struts 26 to control the rate of deployment. Bundles 35 must expand outward as well as longitudinally. Because of the simultaneous expansion of each bundle 35, package 34 can not deploy sequentially but must unfold simultaneously. By the nature of the design, all members of package 34 act as a single degree of freedom system and deploy at the same time. A spring biased joint such as shown in FIG. 5 is one means of supplying the energy required to accomplish automatic, simultaneous, three dimensional deployment.

Figure 7:
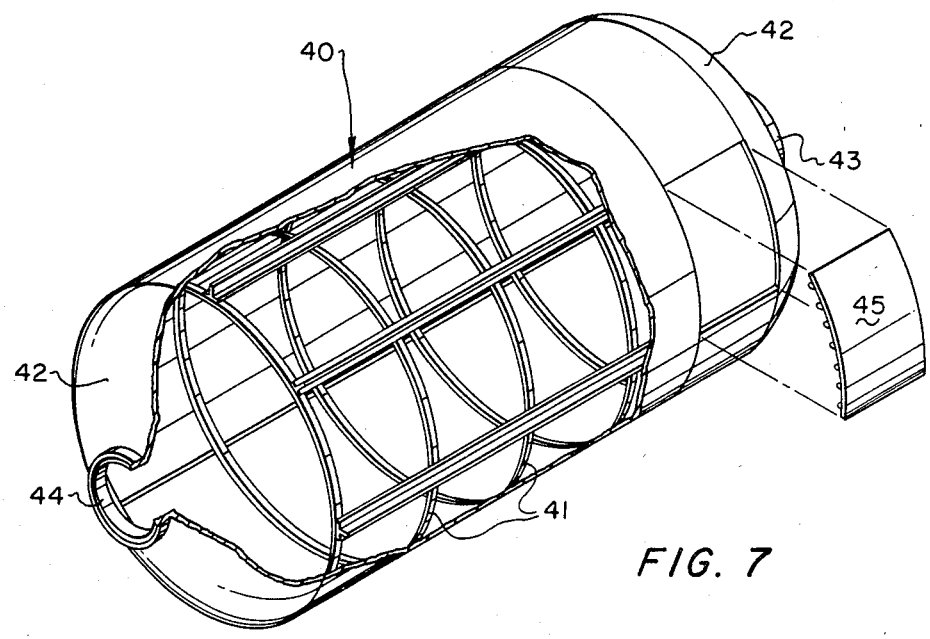
FIG. 7 is a cutaway view of one of the universal modules.

Referring now to FIG. 7, there is shown an enlarged perspective cutaway view of one of the universal modules 15. The universal modules are structural shells with the same design and construction regardless of their function (habital, laboratory, etc.). The modules can be used for various purposes by tailoring the internal arrangement (equipment, partitions, etc.) to meet the specific function. Axially aligned modules 15 may be secured along the apexes 14 of panels 12 and linked together by the array of pressurized tunnels 16 extending along the non-contiguous edges of the panels. A modular array may thus be formed about the parameter of framework 11 for sleeping and working as well as storage of hardware. Each module 15 includes a cylindrical body section 40 constructed around a series of circular ribs 41. Opposite ends of modules 15 include domed sections 42 having a central aperture 43 formed there with a toroidal structural berthing ring 44 formed therearound. A series of independent meteoroid bumper panels 45 are secured around module 15 for protection against meteoroid impact. The module 15 may be configured for utilization by astronauts as environmentally integral work areas as well as living space or configured for laboratories or manufacturing facilities, etc. without change to the outer configuration or structural integrity. Modules up to fourteen (14) feet in diameter and forty six (46) feet in length can be transported by the shuttle orbiter. Also, the tubes forming the pressurized tunnels 16 may be of telescopic construction with seals between adjoining section, for easy storage in the modules during transportation to orbit. The stiff structural triangular framework provides ease of attachment and removal since the attachment points are along the length rather than only at the ends which is similar to attachment of the orbiter and solid rocket boosters to the external tank in the shuttle transportation system. This mode of attachments also reduces structural requirements for the module.

Figure 8:
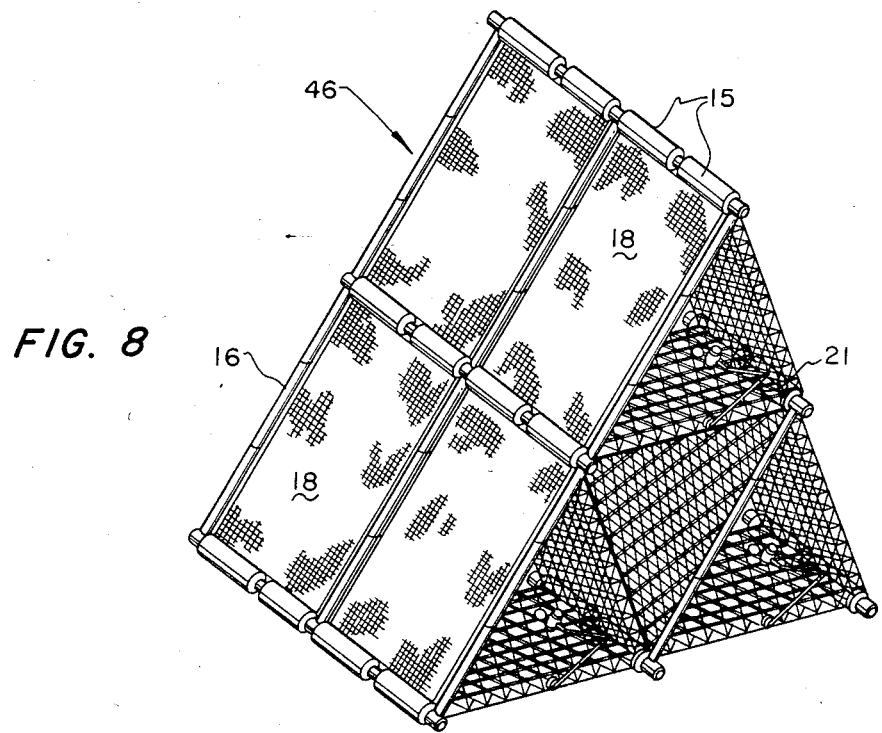
FIG. 8 is a view of an expanded space station constructed from a plurality of structural frameworks.

Referring now to FIG. 8, there is shown an embodiment of a space station 46 wherein a plurality of basic stations have been joined. The configuration of FIG. 7 illustrates the versatility of the structure of the present invention in that the geometrical symmetry affords structural compatibility among multiple units.

The present invention also provides an improved method for establishing the space station 10 in earth orbit. The structural framework 11 can be manufactured on earth and then collapsed into bundles 35, see FIG. 6a, which can be placed in payload bay 22 of the space shuttle orbiter 20 as a package 34. The package 34 is deployed in low orbit by the remote manipulator system of the shuttle and expanded into the structural framework 11 with a minimum of astronaut assistance. The improvement results from constructing framework 11 from three generally planar tetrahedral trusses 12 constructed of a plurality of struts packageable one against the other and simultaneously expandable in three-dimensional deployment. The orbital assembly of the framework 11 includes orienting the bundles 35 into a generally co-planar configuration with the three bundles 35 connected along juxtaposed edges. In this manner, the bundles 35 may be simultaneously expanded in three dimensional translation without inference. The modules 15 are also delivered by the shuttle 20 and easily attachable to the framework 11. Solar cell assemblies and radiators may also be readily attached to the panels 12, see FIG. 1.

It is thus believed that the operation and construction of the present invention will be apparent from the foregoing description. While the method and apparatus shown and described has been characterized as being preferred it will be obvious that various changes and modifications may be made therein without departing from the spirit and scope of the invention as defined in the following claims.

We claim:

1. A space station deployable in earth orbit from elements transported in the payload bay of the Space Shuttle Orbiter, comprising:
a structural framework formed of three rectangular, full area, planar trusses, each of said trusses comprising a plurality of structural struts, said trusses attached together to form a right polygonal body with a cross section in the form of a triangle thereby forming a very stiff structure with a high natural frequency and having a very large area for work space and attachment;
an array of solar panels firmly attached to the outside of a face of at least one of said planar trusses; and
at least one module secured to said framework.

2. The space station system as set forth in claim 1 wherein a plurality of said truss struts are constructed for foldable positioning, one against the other, for facilitating collapsed packaging during launch into earth orbit and the deployment therein into said structural frame.

3. The space station system as set forth in claim 1 wherein each truss comprises a tetrahedral having a pair of generally parallel planar faces formed of a continuous repetition of equilateral triangles generated by a plurality of struts interconnected by node fittings, said faces joined together by diagonal strut members connected to the node fittings.

4. The space station as set forth in claim 3 wherein said face struts are foldable and include an intermediate hinged section and biasing means for automatically unfolding said face struts about said hinge during deployment of said space station.

5. The space station as set forth in claim 1 wherein said modules include generally cylindrical vessels coupled one to another in pressurized communication therebetween and being secured to the apexes of said triangular structural frame.

6. The space station as set forth in claim 5 wherein the modules secured to an apex of said frame are connected to the modules secured to another apex of said frame by elongated tunnels extending along said frame.

7. The space station as set forth in claim 6 wherein each of said elongate tunnels comprise a plurality of telescoping tunnel sections sealingly connected one to the other.

8. The space station as set forth in claim 1 including an array of thermal radiator panels secured to another of said planar trusses.

9. The space station as set forth in claim 1 including thruster units for orientation and altitude maintenance.

10. A space station deployable in earth orbit comprising:
a triangular shaped structural framework;

each side of said framework comprising a rectangular shaped truss having two generally parallel, full area, planar faces, each face formed of a continuous repetition of interconnected equilateral triangles generated by a plurality of struts interconnected by node fittings;

diagonal struts joining the two faces together;

the face struts and the diagonal struts being of approximately the same length.

11. The space station as set forth in claim 10 wherein the struts generating the planar faces are constructed for foldable positioning, one against the other, for facilitating collapsed packaging.

12. The space station as set forth in claim 11 wherein said foldable struts include biasing means for automatically unfolding said struts during deployment.

13. The space station as set forth in claim 10 including an array of solar panels secured to the face of one of said trusses.

14. The space station as set forth in claim 13 including an array of thermal radiators secured to the face of another truss.

15. The space station as set forth in claim 14 including thruster units for orientation and altitude maintenance located on the apexes of the frame.

16. The space station as set forth in claim 15 including at least one module secured to an apex of said frame.

17. A method of establishing a space station in earth orbit comprising the steps of:

fabricating a framework formed of three full area, planar trusses constructed of a plurality of struts;

collapsing each truss to form a bundle;

transporting said bundles into earth orbit in the payload bay of the Space Shuttle Orbiter;

deploying said bundles in said orbit; and expanding said bundles into a structurally stiff triangular framework.

18. The method as set forth in claim 17 wherein said step of expanding said bundles includes the step of simultaneously expanding said trusses in three-dimensional translation.

19. The method as set forth in claim 18 wherein said trusses are each tetrahedrals and said method of three-dimensional deployment includes orienting said trusses in a generally co-planar configuration, connecting said three trusses along juxtaposed edges and simultaneously expanding said trusses.

20. The method as set forth in claim 17 wherein the packaged framework includes three bundles, one for each truss, which are pivotally connected, and the bundles after deployment are rotated about the pivots into a co-planar configuration prior to expansion.

* * * * *